United States Patent
Alvarez et al.

(10) Patent No.: US 7,789,016 B2
(45) Date of Patent: *Sep. 7, 2010

(54) DEVICE FOR SEPARATING BANANA PULP FROM THE PEEL

(75) Inventors: Rafael Angel Lopez Alvarez, Pococi (CR); Raul Fernandez, Weston, FL (US); Ilya Ilyin, St. Petersburg (RU); Jose T. Mejia, Harvey, LA (US); Luis Guilermo Bonilla Murillo, Heredia (CR); Elena Nunez, Cincinnati, OH (US); Audrey Parfenov, St. Petersburg (RU); Julio Schouwe, Pococi (CR); Julio Vasquez, Batavia, OH (US); James H. Wiley, Camden, SC (US)

(73) Assignee: Chiquita Brands, Inc., Cincinnati, OH (US)

( * ) Notice: Subject to any disclaimer, the term of this patent is extended or adjusted under 35 U.S.C. 154(b) by 967 days.

This patent is subject to a terminal disclaimer.

(21) Appl. No.: 11/464,336

(22) Filed: Aug. 14, 2006

(65) Prior Publication Data

US 2007/0122533 A1    May 31, 2007

Related U.S. Application Data

(60) Provisional application No. 60/709,066, filed on Aug. 17, 2005.

(51) Int. Cl.
*A47J 17/00* (2006.01)
(52) U.S. Cl. .............................. 99/584; 99/585; 99/623
(58) Field of Classification Search ........... 99/537–541, 99/584–594, 623–643, 567, 571; 426/481–483, 426/49, 492; 241/188.1, 189.1; 30/123.5, 30/113.1; 198/804
See application file for complete search history.

(56) References Cited

U.S. PATENT DOCUMENTS

| | | | | |
|---|---|---|---|---|
| 3,451,451 A | * | 6/1969 | Polk, Jr. ...................... | 99/584 |
| 3,482,615 A | * | 12/1969 | Adle et al. .................. | 426/482 |
| 3,627,011 A | * | 12/1971 | Pond .......................... | 426/482 |
| 3,700,017 A | * | 10/1972 | Vincent et al. ............... | 99/590 |
| 4,157,065 A | | 6/1979 | Schinko | |
| 4,446,782 A | * | 5/1984 | Black ......................... | 99/589 |
| 4,555,987 A | * | 12/1985 | Tumlinson .................. | 100/118 |
| 4,738,195 A | * | 4/1988 | Berube et al. ................ | 99/591 |
| 5,105,735 A | * | 4/1992 | Gonzalvo .................... | 99/590 |
| 5,112,209 A | * | 5/1992 | Ahrweiler et al. ........... | 425/371 |
| 5,146,681 A | * | 9/1992 | Haghkar .................... | 30/123.5 |
| 5,497,552 A | * | 3/1996 | Rodriguez et al. ......... | 30/123.5 |
| 6,253,670 B1 | * | 7/2001 | Gingras ....................... | 99/589 |
| 6,591,742 B1 | * | 7/2003 | Leonor ....................... | 99/589 |

FOREIGN PATENT DOCUMENTS

| | | |
|---|---|---|
| GB | 2310429 | 8/1997 |
| WO | WO 2005090964 A1 * | 9/2005 |

* cited by examiner

*Primary Examiner*—M. Alexandra Elve
(74) *Attorney, Agent, or Firm*—Frost Brown Todd LLC

(57) ABSTRACT

A device which separates banana pulp from its peel, suitable for large-scale processing, is disclosed. The device consists of upper and lower conveyor belts, a roller installed above the upper belt, and a pressure generating element (e.g., a roller or a plate) installed below the lower belt. The belts are installed so as to converge in the direction of their movement. The axes of the roller(s) is oriented between the longitudinal direction of the lower belt and its transverse direction.

2 Claims, 3 Drawing Sheets

DEVICE FOR SEPARATING BANANA PULP FROM THE PEEL

RELATED APPLICATION

This application is based upon and claims priority from the U.S. Provisional Patent Application No. 60/709,066, Alvarez et al., filed Aug. 17, 2005, incorporated herein by reference.

FIELD OF THE INVENTION

The present invention relates to devices intended for the separation of fruit pulp from peel, in particular, for the separation of banana pulp from peel during large-scale banana processing.

BACKGROUND OF THE INVENTION

There exist a variety of engineering means for separating banana pulp from its peel.

For example, U.S. Pat. No. 4,157,065, "Juice extractor", Shinko, issued Jun. 5, 1979, describes a device for extraction of fruit juice. This device includes a drum, the external surface of which is embraced by a closed, ring-shaped band with holes. Another band, spring-controlled by rollers, is situated above the first band. Fruits or other plant products are placed between the bands. The gap between the bands decreases in the direction of the product's movement, which causes separation (pressing-out) of the juice.

The device described in GB patent 2310429, "Dewatering brown coal", issued Aug. 27, 1997, is intended for dewatering coal. The coal is thrown down from a hopper to the conveyer belt, and is pressed by another belt with rollers located behind the belt. The conveyer belt and the pressing belt are parallel to each other.

U.S. Pat. No. 3,482,615, "Apparatus for and method of removing pulp from a banana", Greene et al., issued Sep. 27, 1967, contains a description of a device intended for separation of banana pulp from the banana peel. The device includes a feeding transporting conveyer and a pair of rotating rollers that press out banana pulp from the peel. The bananas are put on a feeding transporter, with their tips or stems oriented in the direction of the rollers. The conveyer moves the banana toward the rollers, its tip or stem gets into the gap between the rollers, and the banana peel is captured by the rollers' surfaces and pulled between them. The pulp is pressed out from the peel, falls into the gap between the edge of the feeding conveyer and the rollers, where it gets to the belt of another conveyer. With this design, the bananas should be fed to the rollers only in such a way that their tips or stems are oriented forward. If not, they will not be captured by the rollers, and the entire, non-peeled bananas will fall into the gap between the feeding transporting conveyer and the rollers.

If the transporting conveyer is adjacent to the surfaces of the rollers, the bananas can be sent to the rollers at any orientation, not only with their tips or stems facing the direction of the rollers. In this case, a special device will be required for the removal of the extracted banana pulp from the zone near the rollers. Additionally, when the bananas are oriented in parallel to the rollers, the rollers would need to be fairly wide to capture the banana peel.

Therefore, use of the device described in the U.S. Pat. No. 3,482,615 will require special positioning of the bananas, i.e. with their tips or stems facing the rollers. This will require special engineering modifications, which, on the whole, would make the equipment more complicated.

SUMMARY OF THE INVENTION

The present invention is a device that separates banana pulp from its peel regardless of the banana's orientation, and offers high productivity. Two embodiments are described.

According to the first embodiment, the device includes lower and upper conveyer belts, and two rollers. One roller is installed under the lower conveyer belt, while another roller is installed above the upper conveyer belt. The rollers are installed in front of one another so that the lateral surface of each roller can interact with the surface of the corresponding belt. The conveyer belts are installed in such a way that they converge toward the rollers, while the axes of the rollers are oriented between the longitudinal and transverse direction of the lower conveyer belt.

The banana is fed to the lower conveyer belt with random orientation. As the belt moves, the banana is transferred into the gap between the converging belts, where the surfaces of the upper and lower belts come into contact with the banana peel. At that point, the banana also receives pressure from the rollers. The diameter of the rollers does not, therefore, play an important role (although the size of the space between them can). The banana pulp is pressed out from the banana peel, transferred by the lower conveyer belt along the rollers, and falls down sideways from the belt. The peel (being harder than the pulp) continues its further movement between the belts.

Pulling the banana into the zone of pulp extrusion always occurs, regardless of the banana's positioning with respect to the rollers. The banana is pulled into the gap between conveyer belts, which tightly capture the banana peel, even if the rollers are of a small diameter.

The removal of banana pulp from the conveyer belt occurs because the rollers' axes are at an angle to the longitudinal direction of the lower conveyer belt. The banana pulp is rolled along the belt into the zone beside the rollers, and thus gets transferred to the edge of the belt.

The device ensures not only a secure separation of the banana pulp from its peel, but also the transfer of the pulp out of the separation zone. Therefore, the banana pulp is not subjected to additional pressing and, therefore, it is not transformed into a puree.

Thus, the device described herein provides reliable separation of the banana pulp from its peel, regardless of the banana's orientation prior to separation. This translates into simplification of equipment and increased productivity.

The angle at which the conveyer belts converge can be anywhere between the longitudinal direction of the lower belt and its transverse direction, generally between about 30° and about 80°. This range ensures the best capture of the banana prior to the pressing out of the pulp, and the tearing of the peel due to the tension exerted upon it.

In one embodiment, the angle at which the axes of the rollers are oriented stays between about 30° to about 60° as related to the longitudinal direction of the lower conveyer belt. This range ensures the highest productivity for the device, since the pressed-out banana pulp is transferred to the edge of the lower conveyer belt faster.

The conveyer belts can be oriented with respect to one another in the horizontal plane at an angle of 0° to about 60°. The orientation of the belts within this range also leads to faster displacement of pressed-out banana pulp to the lateral edge of the lower conveyer belt—the friction against the upper conveyer belt generates an additional force, transferring the banana pulp in the indicated direction.

Due to the indicated arrangement of conveyer belts, an additional result of the process is the separation of banana pulp from the peel. When the banana is pulled between conveyer belts installed at a horizontal angle, an additional tearing force is generated in the form of opposite forces applied to the banana peel at the points of contact with belts. This facilitates the tearing of the banana peel prior to pressing out of the pulp.

A second embodiment of the device of the present invention includes the lower and upper conveyer belts, as well as a plate installed under the lower conveyer belt and a roller installed above the upper conveyer belt (the plate and the roller positioned one in front of the other). The roller is positioned so that its lateral surface interacts with the surface of the upper belt, while the plate is positioned so that its surface interacts with the surface of the lower belt. The conveyer belts are arranged to converge in the direction of their movement towards the roller, while the roller axis is oriented to remain in the longitudinal direction of the lower conveyer belt and its transverse direction.

In this design, a plate is installed under the lower conveyer belt instead of a roller, together with a roller that has a component for pressing out the banana pulp.

The banana is fed to the lower conveyer belt in arbitrary orientation. With the movement of the belt, the banana gets into a gap between the converging belts, where the surfaces of the upper and lower belts come into contact with the banana peel. Then, the banana receives pressure from the plate and the roller. The pulp is pressed out from the banana peel, is transferred by the lower conveyer belt along the rollers, and falls off to the side. The peel (being harder than the pulp) continues to move along between the belts.

Pulling the banana into the pulp expressing zone always takes place, regardless of the positioning (orientation) of banana with respect to the roller, since the banana is pulled into a gap between the conveyer belts.

Similarly to the first described embodiment:
  The convergence of conveyer belts can be at an angle of about 30° to about 8020 . This range ensures a better capture of the banana prior to the pressing-out of the pulp, and the banana peel is subjected to pressure that leads to tearing of the peel.
  The angle at which the roller's axis is oriented with respect to the longitudinal direction of the lower conveyer belt, should preferably be within about 30° to about 60°. This range ensures better productivity, since the pressed-out banana pulp is displaced to the edge of the lower conveyer belt, faster.
  The conveyer belts can be oriented horizontally at an angle of 0° to about 60° with respect one to another. If the belts are mutually oriented within this range, the period of time during which the pressed-out banana pulp gets displaced to the side edge of the lower conveyer belt is also decreased, since the friction against the upper conveyer belt generates an additional force transferring the banana pulp in the indicated direction.

The results attained during operation of the second embodiment device are similar to those attained during the operation of the first embodiment.

BRIEF DESCRIPTION OF THE DRAWINGS

The invention described here is illustrated by the drawings.

DETAILED DESCRIPTION OF THE INVENTION

Figure 1:
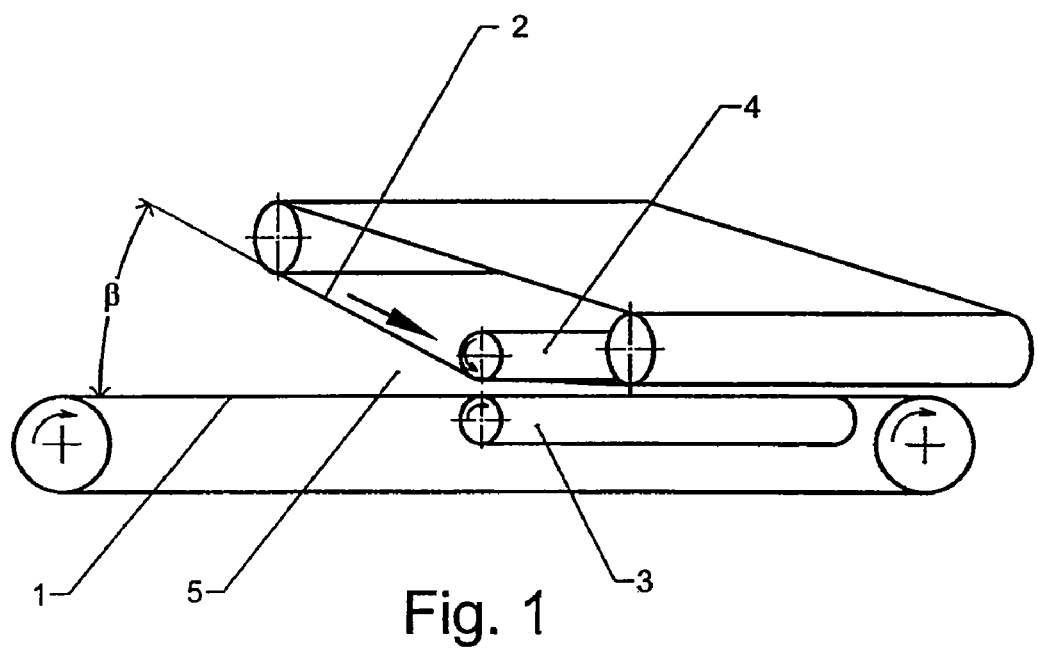
FIG. 1 illustrates the drawing of the device according to first embodiment—side view.

The device for separation of banana pulp from the peel (FIG. 1 and FIG. 2) includes a lower conveyer belt (1), an upper conveyer belt (2), as well as the lower roller (3) installed under the conveyer belt, and the upper roller (4) installed above the upper conveyer belt. The rollers are positioned in front of one another. The axes of the rollers are oriented at an angle ($\alpha$) to the longitudinal direction of the lower conveyer belt. The indicated angle takes any value within the range of about 30° to about 60°.

The conveyer belts converge at an angle ($\beta$), which takes any value within the range of about 30° to about 8020 . The lower limit of the range is determined by the need to capture the banana peel in the gap (5) by the surface of belts near the rollers. When the angle ($\beta$) between the belts is greater than about 80°, this does not allow to reliably capture an arbitrarily oriented banana between the belts.

The size of the gap between the belts at the point where the rollers are located, stays in the range of about 2 to about 10 mm.

Additionally, the conveyer belts are positioned under a certain angle ($\gamma$) to each other in the horizontal plane.

A second embodiment of the device (FIG. 3, FIG. 4) also includes the lower conveyer belt (1) and the upper conveyer belt (2). In contrast with the first alternative, there is a plate (6) under the lower conveyer belt, while a roller (7) is installed above the upper conveyer belt. The axis of the roller is oriented at an angle ($\alpha$) to the longitudinal direction of the lower conveyer belt, and the angle ($\alpha$) is in the range of about 30° to about 60°.

Figure 2:
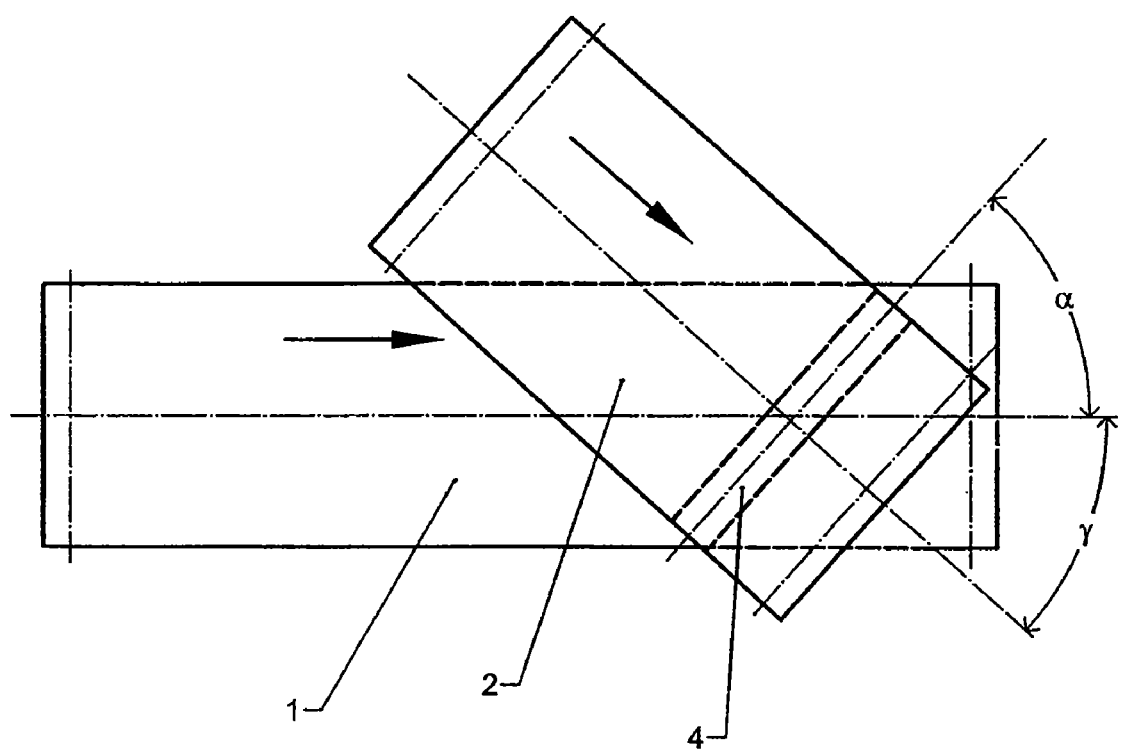
FIG. 2 illustrates the same device, viewed from above.
Figure 3:
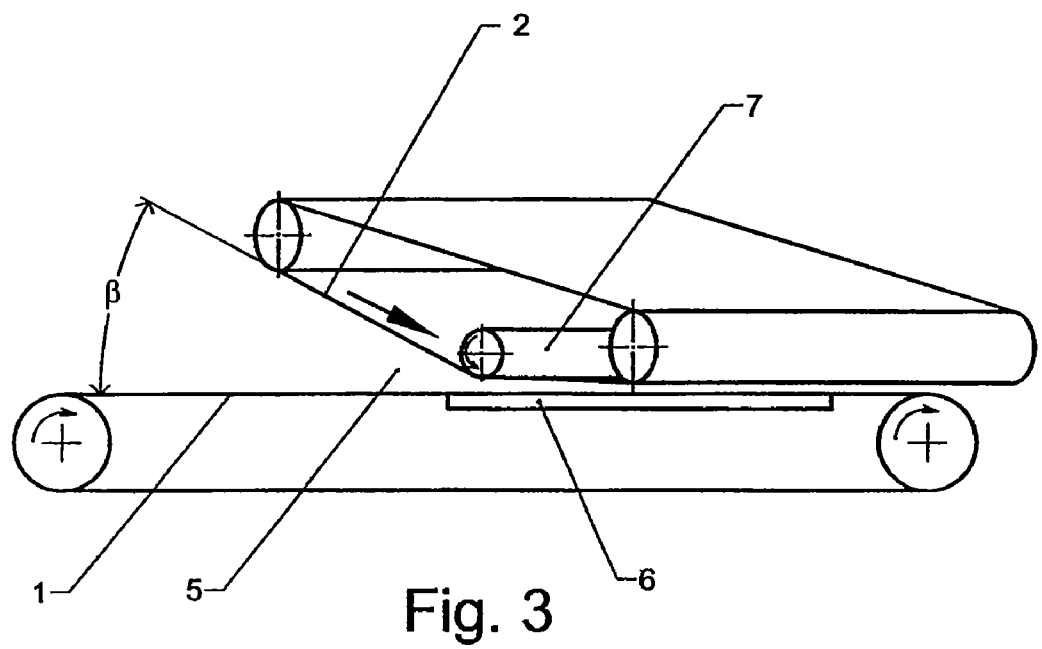
FIG. 3 illustrates the drawing of the device according to the second embodiment—side view.
Figure 4:
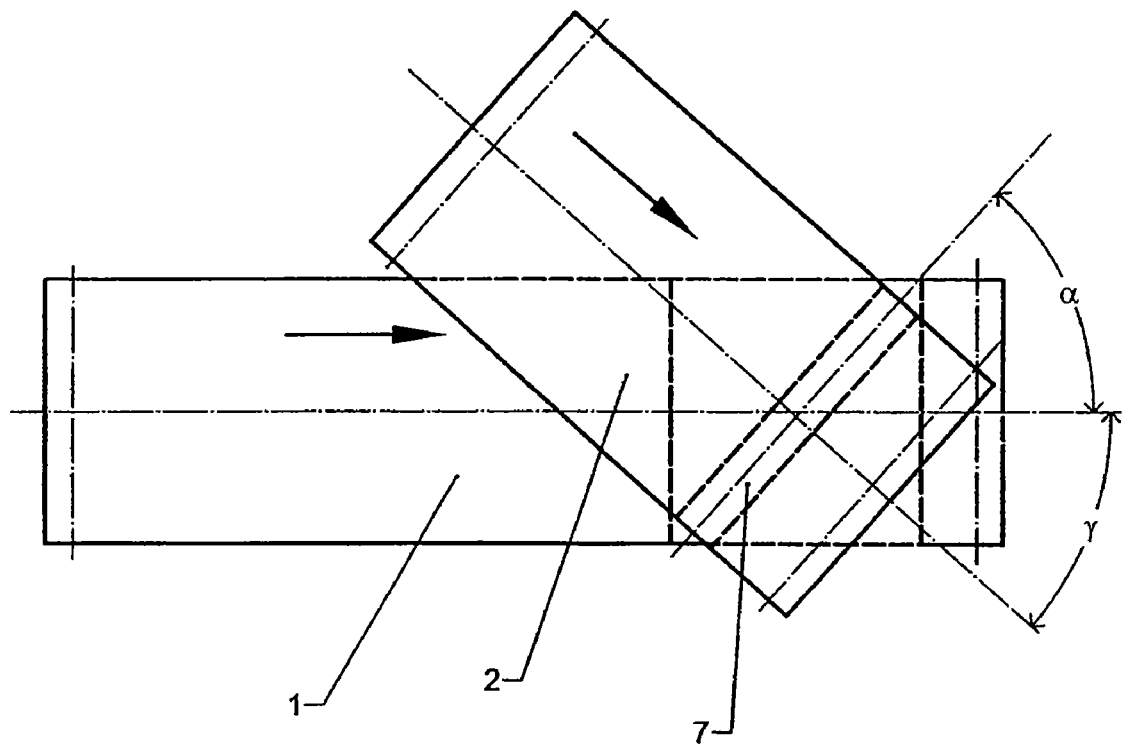
FIG. 4 illustrates the same device, viewed from above.
Figure 5:
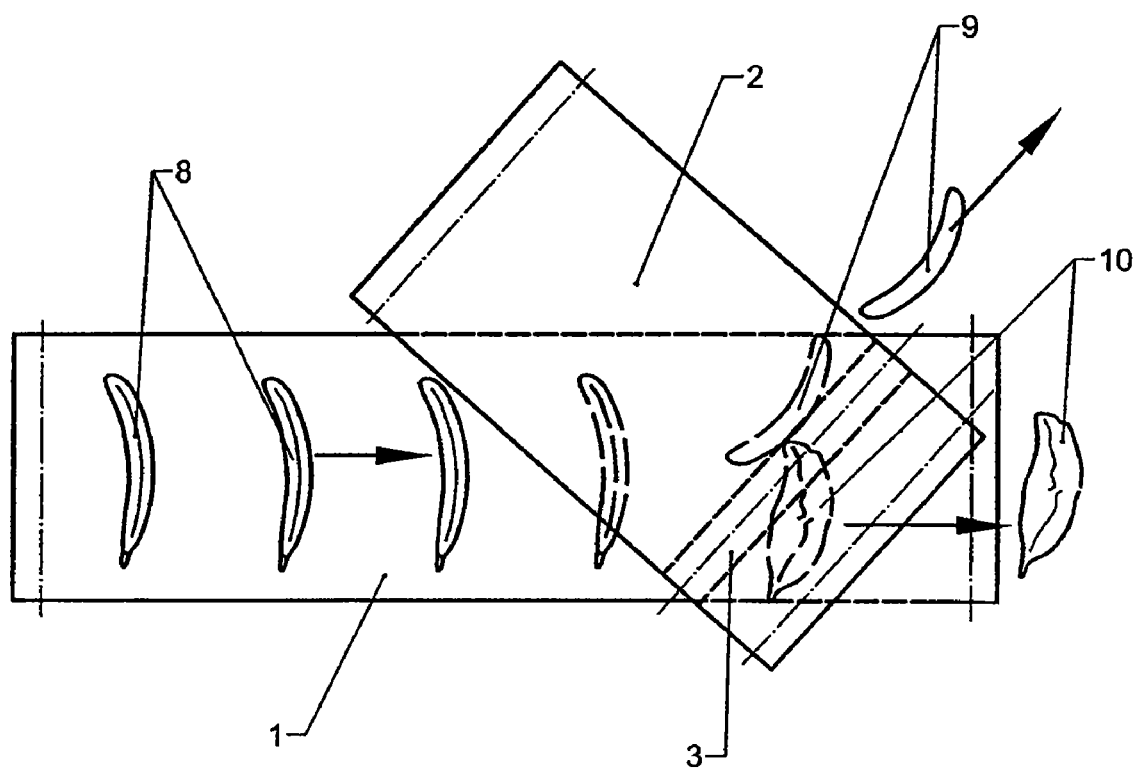
FIG. 5 illustrates the processes taking place during separation of banana pulp from peel.

The device operates in the following way (FIG. 1-FIG. 3). Bananas (8) are fed to the lower conveyer belt in an arbitrary orientation. With the movement of the lower conveyer belt, a banana is captured in the gap between the upper and lower conveyer belts. As the banana moves further between the conveyer belts, it is pressed under the rollers. Banana pulp (9) is pressed out from the peel (10) and is transferred by the belt along the zone where the rollers are located. It then falls to the side from the belt, thereby getting into the hopper or to the transporting conveyer (not shown in Figs.). It is then delivered to the subsequent processing point. The peel continues further between the rollers, and later also falls down off the belt, already in longitudinal direction, also getting either into the hopper or to the transporting conveyer for subsequent processing.

The device representing the second embodiment (FIG. 3, FIG. 4) operates in the same way as the first. The banana gets pressed by the plate and the roller. The pulp is pressed out from the peel and gets transferred by the belt along the zone where the roller is located. It then falls to the side, from the belt. In contrast with the first embodiment, the displacing action upon the pulp is exerted only by the roller located above the upper conveyer belt. However, the obtained result will be identical in both cases. The solution according to the second embodiment is less complicated in terms of design.

In both embodiments, a pressure generating element is located beneath the lower conveyor belt. In the first embodiment that pressure generating element is a roller; in the second embodiment, it is a plate.

The use of the device described here allows separation of the banana pulp from the peel with random orientation of bananas, and results in enhanced productivity.

What is claimed is:

1. A device for separation of banana pulp from banana peel comprising upper and lower conveyer belts, each belt having an upper and lower surface, and two rollers, one roller installed under the lower conveyer belt, the other roller installed above the upper conveyer belt, and each roller having a surface, such that:
   a. the rollers are installed one forward of the other based on the direction of the conveyer belt's movement, so it is possible for the surface of each roller to interact with the corresponding surface of the corresponding belt, so as to press the bananas between the upper and lower belts;
   b. the two conveyer belts are installed to converge as they move in the direction towards the rollers, where the convergence of conveyer belts is at an angle between about 30° to about 80°; and
   c. the axes of the rollers are oriented in a direction that remains between the longitudinal direction of the lower conveyer belt and its transverse direction, where the angle at which the roller axes are oriented is between about 30° and about 60° with respect to the longitudinal direction of the lower conveyer belt.

2. A device for separation of banana pulp from banana peel, including lower and upper conveyer belts, each belt having a lower surface and an upper surface, a plate positioned under the lower surface of the lower conveyer belt, and a roller installed above the upper surface of the upper conveyer belt, said roller having a surface, such that:
   a. the plate and the roller are positioned one forward of the other based on the direction of the movement of the conveyer belt;
   b. the roller is positioned such that its surface interacts with the surface of the upper belt;
   c. the plate is positioned such that its surface interacts with the surface of the lower belt, so as to press the bananas between the upper and lower belts;
   d. the conveyer belts are arranged to converge as they move in the direction towards the roller where the convergence of conveyer belts occurs at angle between about 30° to about 60°; and
   e. the roller's axis is oriented in a direction that remains between the longitudinal direction of the lower conveyer belt and its transverse direction where the conveyer belts are mutually horizontally oriented at an angle between about 30° and about 60°.

* * * * *